US010306593B1

(12) United States Patent
Govindassamy et al.

(10) Patent No.: US 10,306,593 B1
(45) Date of Patent: May 28, 2019

(54) METHOD AND APPARATUS FOR BROADCAST CHANNEL DECODER

(71) Applicant: MBIT WIRELESS, INC., Irvine, CA (US)

(72) Inventors: Sivakumar Govindassamy, Irvine, CA (US); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 15/879,871

(22) Filed: Jan. 25, 2018

Related U.S. Application Data

(62) Division of application No. 14/680,598, filed on Apr. 7, 2015, now Pat. No. 9,924,493.

(51) Int. Cl.
*H04W 24/00* (2009.01)
*H04W 72/00* (2009.01)
*H04L 27/26* (2006.01)
*H04W 56/00* (2009.01)
*H04W 72/12* (2009.01)

(52) U.S. Cl.
CPC ....... *H04W 72/005* (2013.01); *H04L 27/2601* (2013.01); *H04W 56/00* (2013.01); *H04W 72/1263* (2013.01)

(58) Field of Classification Search
None
See application file for complete search history.

(56) References Cited

U.S. PATENT DOCUMENTS

| 8,582,505 | B2 | 11/2013 | Luo et al. | |
| 9,065,630 | B1 * | 6/2015 | Xiao | H04W 56/0085 |
| 2011/0292875 | A1 * | 12/2011 | Luo | H04B 1/7107 |
| | | | | 370/328 |
| 2012/0307691 | A1 | 12/2012 | Wang | |
| 2013/0122822 | A1 * | 5/2013 | Srinivasan | H04J 11/0073 |
| | | | | 455/67.13 |

* cited by examiner

*Primary Examiner* — Sithu Ko
(74) *Attorney, Agent, or Firm* — Lerner, David, Littenberg, Krumholz & Mentlik, LLP

(57) ABSTRACT

In wireless communications systems, a client terminal performs cell search procedure to find a suitable cell and camp on it to receive service from the network. In 3GPP LTE wireless communication system, the initial cell search involves the decoding of the Physical Broadcast Channel (PBCH) which may take a long time to decode which affects the time it takes to camp on an appropriate cell. One of the reasons for this is that conventional methods perform PBCH decoding sequentially to find a suitable cell. A method and apparatus are disclosed that perform the PBCH decoding in parallel for multiple cells. This method enables the client terminal to camp on a cell and receive service faster than conventional methods.

16 Claims, 15 Drawing Sheets

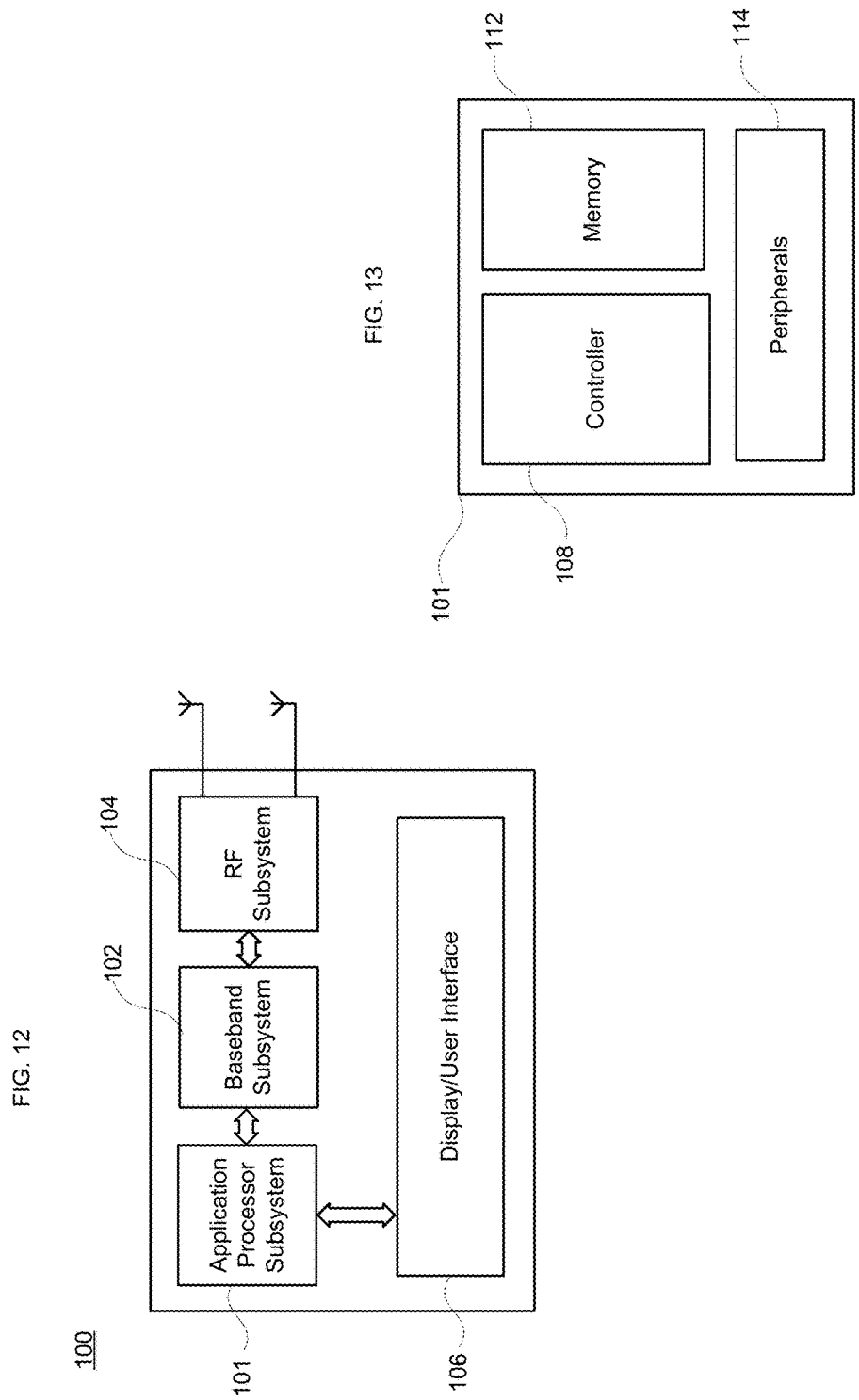

METHOD AND APPARATUS FOR BROADCAST CHANNEL DECODER

CROSS REFERENCE TO RELATED APPLICATIONS

The present application is a divisional of U.S. patent application Ser. No. 14/680,598, filed Apr. 7, 2015, the disclosure of which is incorporated herein by reference.

BACKGROUND OF THE INVENTION

As shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred as the serving base station. In some wireless communication systems the serving base station is normally referred as the serving cell. The terms base station and a cell may be used interchangeably herein. In general, the cells that are in the vicinity of the serving cell are called neighbor cells. Similarly, in some wireless communication systems a neighbor base station is normally referred as a neighbor cell.

Client terminals used in wireless communication systems are required to search for the network, acquire the network information, camp on to the network and register for service. The aforementioned process is collectively called "network registration."

The network registration process may normally take place in different scenarios that include but are not limited to powering on the client terminal, attempting to obtain service after a loss of network coverage (e.g., a dropped call due to a "dead spot" in the network), and when roaming from one network to another.

Since the client terminal is initially not synchronized with any of the base stations, it must first find the synchronization information such as the air interface timing and frequency. In the 3rd Generation Partnership Project (3GPP) Long Term Evolution (LTE) wireless communication system, the network may use a number of different channel bandwidths. Also, the radio frame number (RFN) and the Physical Hybrid Automatic Repeat Request (HARM) Indicator Channel (PHICH) configuration information is required for the client terminal to receive further details about the network. The above information is transmitted by each BS in the Physical Broadcast Channel (PBCH). The payload inside the PBCH is referred as Master Information Block (MIB). The MIB is used for further processing in the client terminal for network registration.

The 3GPP LTE wireless communication system air interface is organized into frames, subframes, and Orthogonal Frequency Division Multiplexing (OFDM) symbols as shown in FIG. 2, where the frame duration is 10 ms, the subframe duration is 1 ms and an OFDM symbol duration is in the range of 70 µs to 85 µs depending on the air interface configuration. The PBCH is transmitted over a duration of four OFDM symbols in subframe number zero and it is transmitted in every radio frame. The payload of the PBCH does not change over a period of four radio frames as shown in FIG. 3.

This allows the client terminal to perform combining of the PBCH over four radio frames as shown in FIG. 4. However, the PBCH contains the RFN in the payload (MIB) and the change of the RFN in payload occurs every four frames on a boundary where RFN modulo four is equal to zero as shown in FIG. 4. The RFN in the MIB contains only the upper eight most significant bits. The two least significant bits are zero for the frame where the change of the MIB content occurs. Since the client terminal is not aware of the RFN, the combining must be done over a period of seven frames while pursuing multiple parallel hypotheses as shown in FIG. 5. Each hypothesis starts at a new radio frame and corresponds to the two least significant bits of the RFN equal to zero. Only one of the four hypotheses can be correct and in the worst case it may be the last hypothesis that may be correct. As shown in FIG. 5, the hypothesis 4 is correct as the RFN is 104, which has two least significant bits equal to zero. Therefore, the worst case time required for one complete PBCH decode attempt for one cell is seven frames (7*10=70 ms).

The radio frame and subframe boundary are detected by the client terminal during the cell search procedure by first detecting the Primary Synchronization Signal (PSS) and then Secondary Synchronization Signal (SSS) as shown in FIG. 2. The PSS and SSS detection timing is relative to the internal timing of the client terminal and it is referred to herein as timing offset. The radio frame and subframe start timing is derived from the timing offsets of the detected PSS and SSS. The SSS detection requires the PSS time offset as an input from the PSS detection procedure. Therefore, the SSS detection may be scheduled only after successful PSS detection.

The timing of the receive window for decoding PBCH is based on the radio frame and subframe timing detected for a given cell based on SSS detection for that cell. Therefore, the PBCH detection may be scheduled only after successful SSS detection for that cell. In the remainder of the present disclosure whenever SSS detection is scheduled it is implicit that it is preceded by a successful PSS detection. Similarly, whenever PBCH detection is scheduled it is implicit that it is preceded by a successful SSS detection. Since the radio frame duration is 10 ms, the largest SSS timing offset can at most be 10 ms relative to the internal timing of the client terminal.

In cellular communication systems that employ frequency reuse, different cells may use the same Radio Frequency (RF) channel. When the client terminal performs SSS detection on a given RF channel, it may detect the SSS signals from multiple cells that are using the same RF channel. In addition to the radio frame and subframe timing of a cell, the SSS detection provides Physical Cell Identity (PCI), and may provide metrics such as signal strength and signal quality such as the Signal to Interference plus Noise Ratio (SINR) for each of the detected cell identified by its PCI. The various SSS detection metrics of a cell are collectively referred herein as a SSS detection report.

The next step after SSS detection is the PBCH decoding. The detection reports of cells for which the SSS detection was successful may be arranged in descending order according to different metrics such as estimated SINR, estimated SSS signal power, etc. Typically the cell with the highest ranked (e.g., "strongest") SSS detection report may be selected for scheduling the PBCH decoding for that cell. However, the cell with the highest ranked or strongest SSS detection report may not necessarily lead to successful PBCH decode or may not be a suitable cell for network registration. In this case the client terminal may select another cell with next strongest SSS detection report and schedule the PBCH detection for that cell. This process continues until a successful PBCH decode, followed by a successful System Information (SI) decode, is performed for a cell that is suitable based on the decoded SI. This process of decoding the PBCH for different cells is sequential and may cause the client terminal to take a longer time to register to the network and be available for service. This can be disadvantageous as the longer it takes to register the more power is consumed in the client device. It may also degrade the user experience. The decoding of PBCH for multiple cells is required in many scenarios including cell reselection and handovers. For example, in case of femtocells deployed with restricted access using Closed Subscriber Group (CSG) feature, the need for decoding PBCH in a timely manner for multiple cells is critical. The femtocells are often referred as Home evolved Node-B (HeNB) in the 3GPP specification.

BRIEF SUMMARY OF THE INVENTION

A method and apparatus are disclosed that enable enhanced cell searching by client terminals in a cellular communication system. Parallel decoding techniques lead to more efficient operation, which provides service faster than conventional operation. Therefore, such techniques are advantageous not only to the wireless device itself, but also to overall communication with the wireless network.

In accordance with an aspect of the present invention, a method is provided that includes scheduling, by a processor, Secondary Synchronization Signal (SSS) detection on a selected radio frequency channel used for communication by a wireless communication device to obtain a set of SSS detection reports; extracting, by the processor, any SSS detection reports from a composite group of SSS detection reports that are separated by at least a predetermined time duration; adding, by the processor, the extracted SSS detection reports to one or more new groups of SSS detection reports; selecting, by the processor, one of the one or more new groups of SSS detection reports that contains a highest ranked SSS detection report; scheduling, by the processor, parallel Physical Broadcast Channel (PBCH) decoding for each SSS detection report in the selected group of SSS detection reports according to timing offsets of the SSS detection reports therein; determining, by the processor, whether the PBCH decoding was successful for any of the SSS detection reports in the selected partitioned group; and using the successful PBCH decoding for communication between the client device and a wireless base station of a wireless communication system.

In one alternative, the method further comprises sorting the SSS detection reports in a time-first order from a lowest time offset to a highest time offset; and placing the sorted SSS detection reports in the composite group prior to the extraction. In this case, the method may further comprise, upon sorting the SSS detection reports in the time-first order, creating the one or more new groups of SSS detection reports. Here, extracting the SSS detection reports from the composite group includes identifying all of the SSS detection reports in the composite group that are separated from each other by at least a predetermined Δt time duration, removing the identified SSS detection reports, and placing the identified SSS detection reports in a given one of the one or more new groups of SSS detection reports. And when any SSS detection reports remain in the composite group after the extracting, the method may further include creating another one of the new groups of SSS detection reports; and extracting one or more additional SSS detection reports from the composite group in accordance with the predetermined time duration.

In another alternative, when the PBCH decoding was successful for any of the SSS detection reports in the selected partitioned group, the method further comprises scheduling the PBCH decoding for any remaining SSS detection reports in the selected partition group. And when the PBCH decoding was not successful for any of the SSS detection reports in the selected partitioned group, the method may further comprise determining whether a maximum number of combining attempts has been made for each SSS timing offset. Here, the method may further comprise checking whether all of the groups of SSS detection reports have been processed prior to using the successful PBCH decoding for communication between the client device and the wireless base station.

In accordance with another aspect, a method is provides that includes obtaining, by a processor of a wireless communication device, a plurality of Secondary Synchronization Signal (SSS) detection reports, each SSS detection report including one or more SSS detection metrics therein, and each SSS having a timing offset associated therewith relative to internal timing of the wireless communication device; partitioning, by the processor, the SSS detection reports into separate groups in accordance with the timing offsets to enable Physical Broadcast Channel (PBCH) decoding for multiple cells in parallel; scheduling, by the processor, the parallel PBCH decoding corresponding to all SSS timing offset candidates in a selected one of the partitioned groups; determining, by the processor, whether the PBCH decoding was successful for any of the SSS timing offset candidates in the selected partitioned group; and using the successful PBCH decoding for communication between the client device and a given one of the multiple cells.

In one example, partitioning the SSS detection reports into separate groups includes determining whether time differences between certain ones of the SSS detection reports satisfies a configurable threshold Δt. In another example, the selected partitioned group includes the SSS detection report having a highest ranked detection metric. Here, the detection metric may be a Signal to Interference plus Noise Ratio (SINR) from the SSS detection reports.

In another example, the method further comprises opening and closing a receive window for respective SSS timing offsets to perform PBCH reception and decoding for each SSS timing offset in a given group in parallel. In a further example, the method further comprises combining the PBCHs among selected radio frames in parallel for all the PBCHs corresponding to each of the SSS timing offsets in a currently selected SSS detection reports group.

In yet another example, the method further comprises saving soft bits for each channel bit in one or more separate buffers for the PBCH decoding corresponding to each of the SSS timing offset candidates in the selected partitioned groups. Here, when the PBCH decoding for a cell fails in a first attempt, during a subsequent receive window opening for each PBCH the soft bits from a previous PBCH decoding attempt for corresponding ones of the SSS detection reports group may be combined.

In another example, whenever the PBCH decoding for one SSS timing offset completes, a new candidate from a second SSS detection reports group is searched for insertion into an available time gap for decoding the PBCH. A further example comprises placing the parallel PBCH decoding on hold upon detection of one or more successful PBCH decoding operations. And in yet another example, the method further comprises instantiating a single PBCH decoder to perform the parallel PBCH decoding; and associating the single PBCH decoder with multiple soft-bit buffers corresponding to each cell and each hypothesis within a cell corresponding to two lowest bits of a frame number.

According to another aspect of the invention, a receiver device for a wireless communication apparatus is provided. The receiver device comprises means for receiving signals from one or more cells in a wireless communication system, and one or more processing devices operatively coupled to the receiving means. The one or more processing devices are configured to: schedule Secondary Synchronization Signal (SSS) detection on a selected radio frequency channel used for communication by a wireless communication device to obtain a set of SSS detection reports; extract any SSS detection reports from a composite group of SSS detection reports that are separated by at least a predetermined time duration; add the extracted SSS detection reports to one or more new groups of SSS detection reports; select one of the one or more new groups of SSS detection reports that contains a highest ranked SSS detection report; schedule parallel Physical Broadcast Channel (PBCH) decoding for each SSS detection report in the selected group of SSS detection reports according to timing offsets of the SSS detection reports therein; determine whether the PBCH decoding was successful for any of the SSS detection reports in the selected partitioned group; and use the successful PBCH decoding for communication between the client device and a given one of the cells.

In one alternative, the one or more processing devices are further configured to sort the SSS detection reports in a time-first order from a lowest time offset to a highest time offset, and place the sorted SSS detection reports in the composite group prior to the extraction.

In another alternative, upon sorting the SSS detection reports in the time-first order the one or more processing devices create the one or more new groups of SSS detection reports. Here, extraction of the SSS detection reports from the composite group includes: identifying all of the SSS detection reports in the composite group that are separated from each other by at least a predetermined Δt time duration, removing the identified SSS detection reports, and placing the identified SSS detection reports in a given one of the one or more new groups of SSS detection reports.

In a further alternative, when the PBCH decoding was successful for any of the SSS detection reports in the selected partitioned group, the one or more processing devices schedule the PBCH decoding for any remaining SSS detection reports in the selected partition group. And when the PBCH decoding was not successful for any of the SSS detection reports in the selected partitioned group, the one or more processing devices determine whether a maximum number of combining attempts has been made for each SSS timing offset.

And according to further aspects of the present invention, a wireless communication apparatus is provided. The apparatus comprises means for receiving signals from one or more cells in a wireless communication system, and one or more processing devices operatively coupled to the receiving means. The one or more processing devices are configured to: obtain a plurality of Secondary Synchronization Signal (SSS) detection reports, each SSS detection report including one or more SSS detection metrics therein, and each SSS having a timing offset associated therewith relative to internal timing of the wireless communication apparatus; partition the SSS detection reports into separate groups in accordance with the timing offsets to enable Physical Broadcast Channel (PBCH) decoding for multiple cells in parallel; schedule the parallel PBCH decoding corresponding to all SSS timing offset candidates in a selected one of the partitioned groups; determine whether the PBCH decoding was successful for any of the SSS timing offset candidates in the selected partitioned group; and use the successful PBCH decoding for communication between the wireless communication apparatus and a given one of the cells.

In one example, the one or more processing devices are further configured to open and close a receive window for respective SSS timing offsets to perform PBCH reception and decoding for each SSS timing offset in a given group in parallel. In another example, the one or more processing devices are further configured to combine the PBCHs among selected radio frames in parallel for all the PBCHs corresponding to each of the SSS timing offsets in a currently selected SSS detection reports group. In yet another example, the one or more processing devices are further configured to save soft bits for each channel bit in one or more separate buffers for the PBCH decoding corresponding to each of the SSS timing offset candidates in the selected partitioned groups. and according to another example, the one or more processing devices are further configured to: instantiate a single PBCH decoder to perform the parallel PBCH decoding; and associate the single PBCH decoder with multiple soft-bit buffers corresponding to each cell and each hypothesis within a cell corresponding to two lowest bits of a frame number.

BRIEF DESCRIPTION OF THE DRAWINGS

FIG. 12 illustrates a block diagram of an example wireless mobile station, which may be employed with aspects of the invention described herein.

FIG. 13 illustrates a block diagram of an application processor subsystem for a wireless mobile station, which may be employed with aspects of the invention described herein.

DETAILED DESCRIPTION

Figure 1:
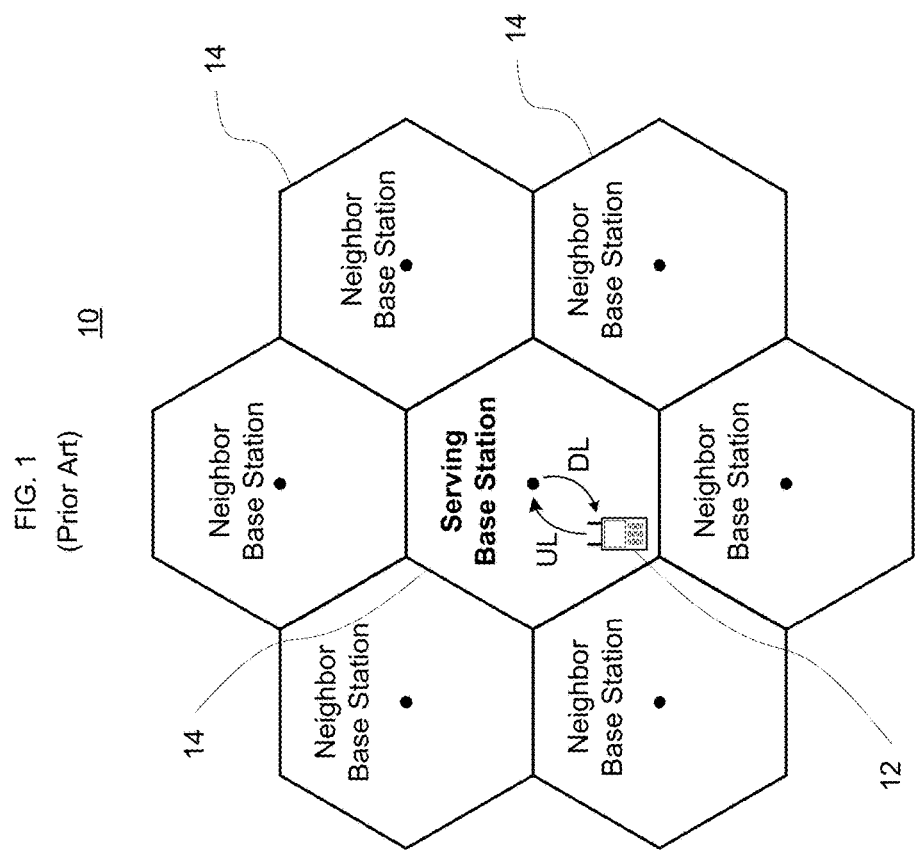
FIG. 1 illustrates a conventional mobile wireless communication system.
Figure 2:
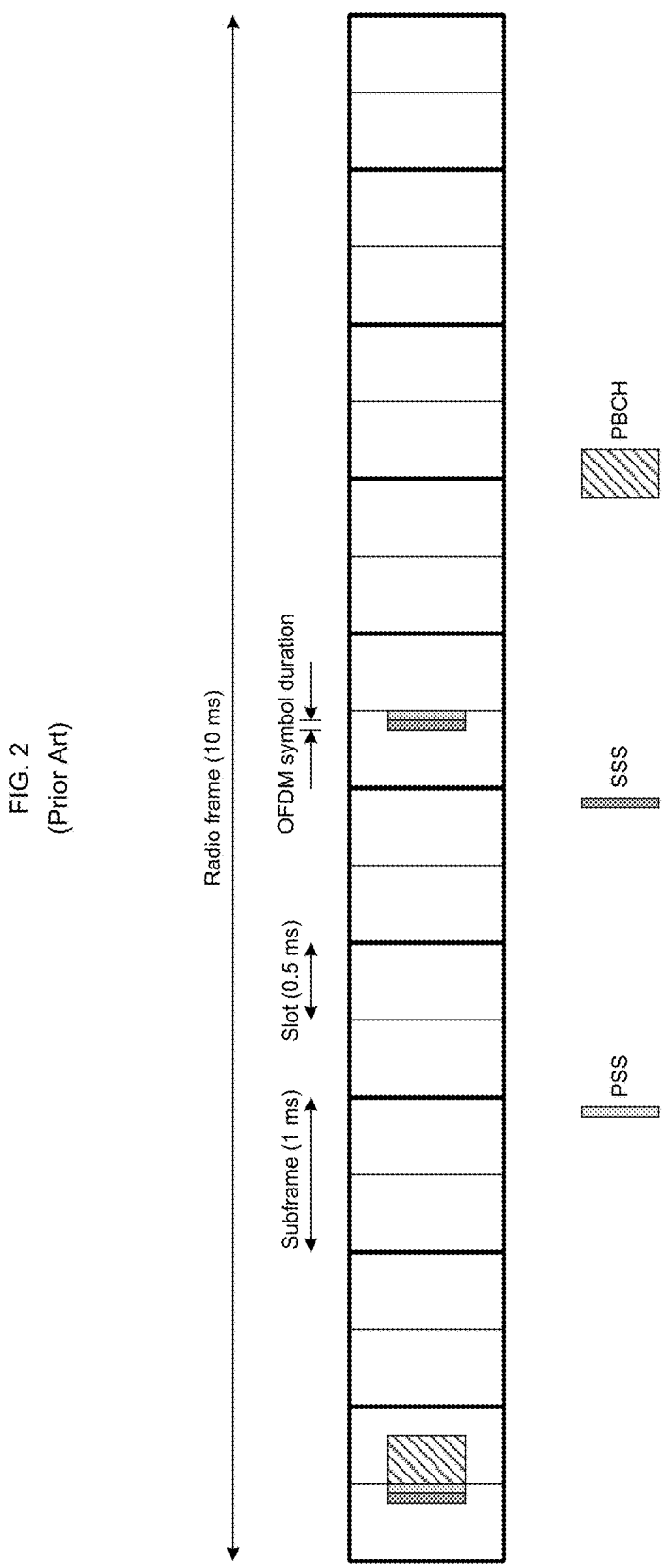
FIG. 2 illustrates a high level air-interface structure of the 3GPP LTE wireless communication system.
Figure 3:
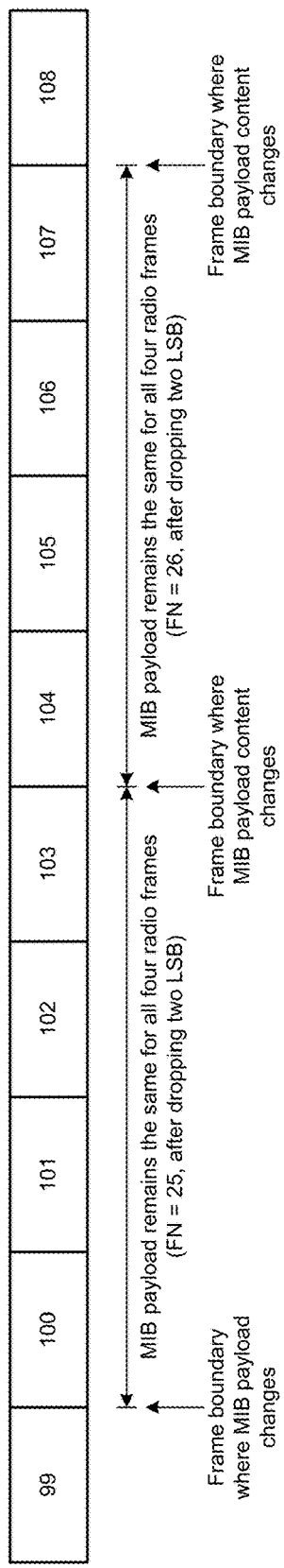
FIG. 3 illustrates the radio frame number mapping to the radio frames and MIB payload.
Figure 4:
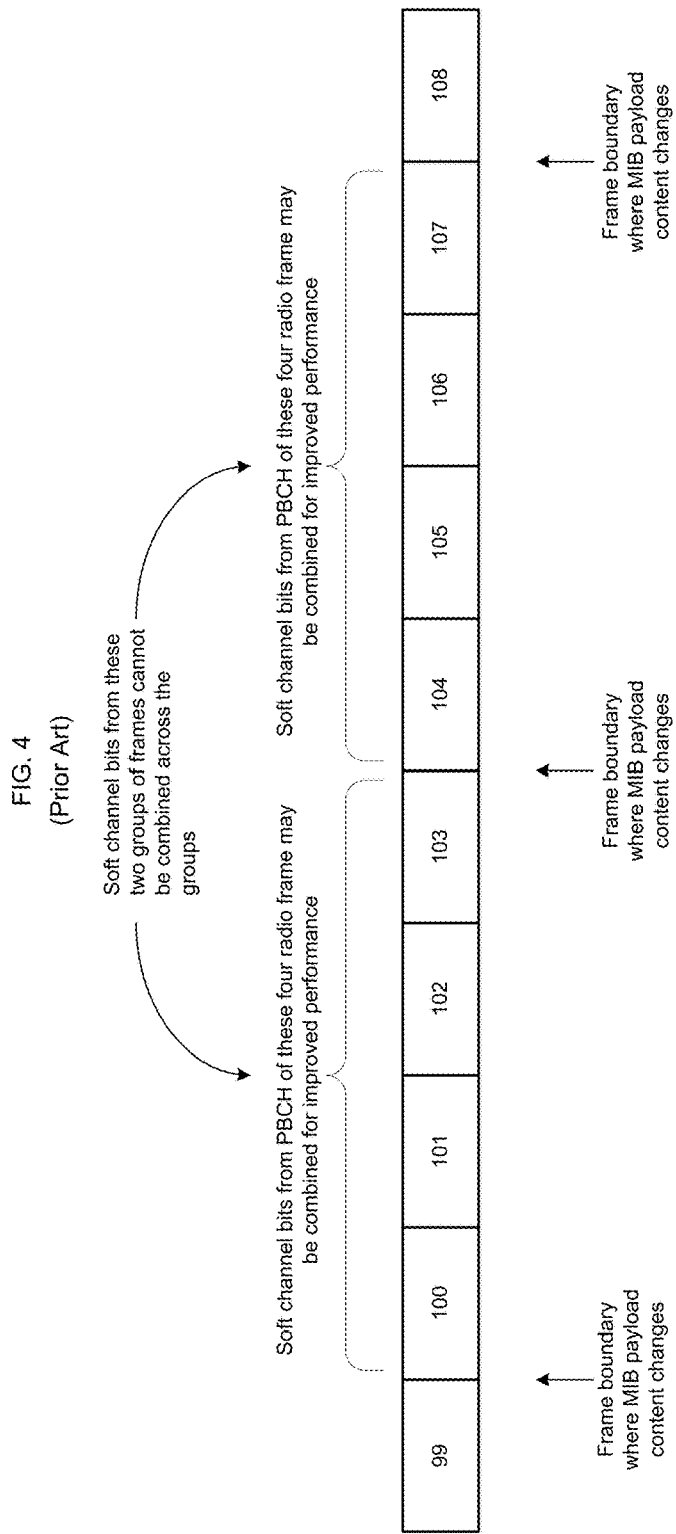
FIG. 4 illustrates the combining of information from four radio frames over which the same MIB payload is transmitted.
Figure 5:
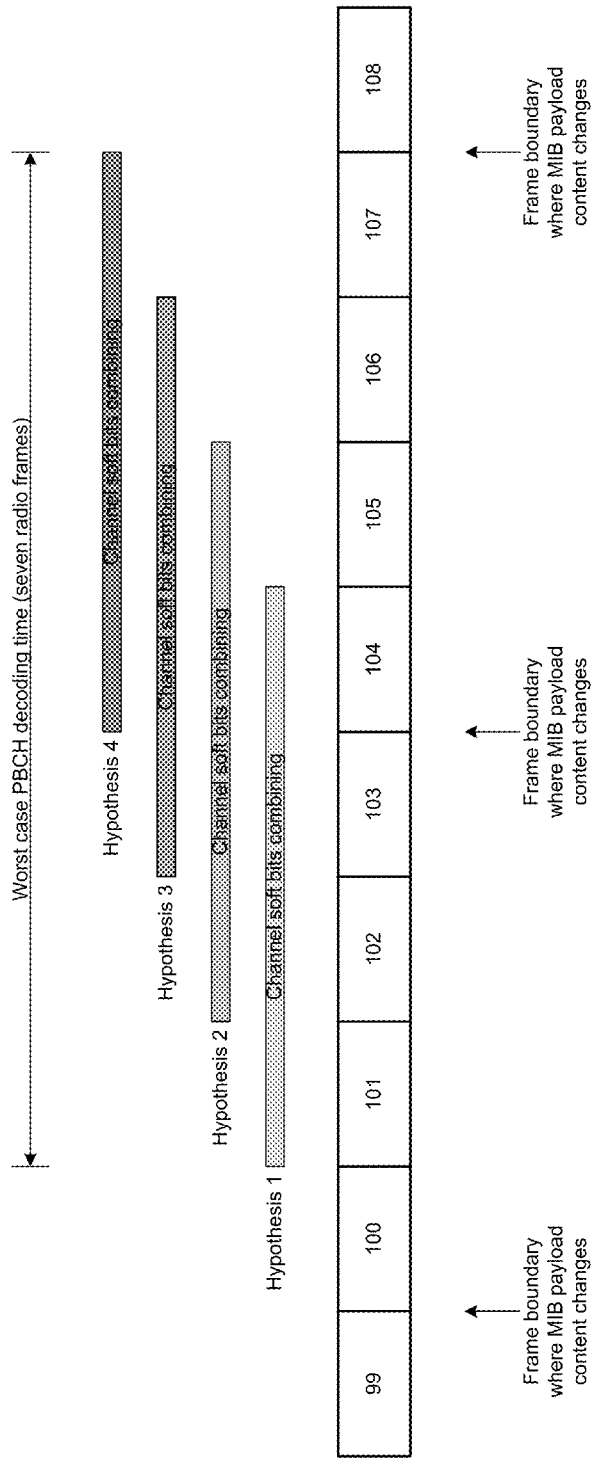
FIG. 5 illustrates the combining of MIB information from four radio frames and pursuit of parallel hypotheses.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

A method and apparatus are disclosed that enable the decoding of the PBCH for multiple cells in parallel. The parallel decoding allows the client terminal to find the suitable cell faster and enables it to register and enter into the normal service state faster. This results in a more efficient and responsive system and better quality of service for users.

The PBCH is transmitted once every radio frame (10 ms) and it is present over four OFDM symbols (less than 350 μs). The PBCH decoder in a client terminal may be inactive during the time between the two instances of the PBCH transmission from a given cell. A method is disclosed that enables the use of PBCH decoder for other cells during the time between two PBCH transmission instances of a given cell. According to the aspects of the present invention, the SSS detection reports are partitioned into separate groups based on the SSS time offsets to enable the use of a single instance of the PBCH decoder to decode PBCH for multiple cells in parallel while pursuing multiple hypotheses for the lower two bits of the frame number.

According to an aspect of the present invention, all the SSS detection reports are sorted and placed in a first SSS detection reports group according to the time first order, i.e., a report with the lowest timing offset is placed first in the SSS detection reports group. According to another aspect of the invention if the time difference between the two SSS timing offset reports is greater than a certain configurable threshold $\Delta t$ (for example 1 ms), the SSS detection reports are retained in the same SSS detection reports group. Otherwise, the SSS detection reports are moved to a second SSS detection reports group. This process is continued until all the SSS detection reports in the first SSS detection reports group are processed. All the SSS detection reports remaining in the first SSS detection report group after the above step are used for scheduling PBCH decoding.

Next, if one or more SSS detection reports are moved from the first SSS detection reports group to a second SSS detection reports group, they are sorted again in a time first order if required. Any adjacent SSS detection reports for which the difference in timing offset is not meeting the configurable threshold $\Delta t$ are moved to a third SSS detection reports group. This process is continued until all the SSS detection reports in the second SSS detection reports group are processed.

Figure 6:
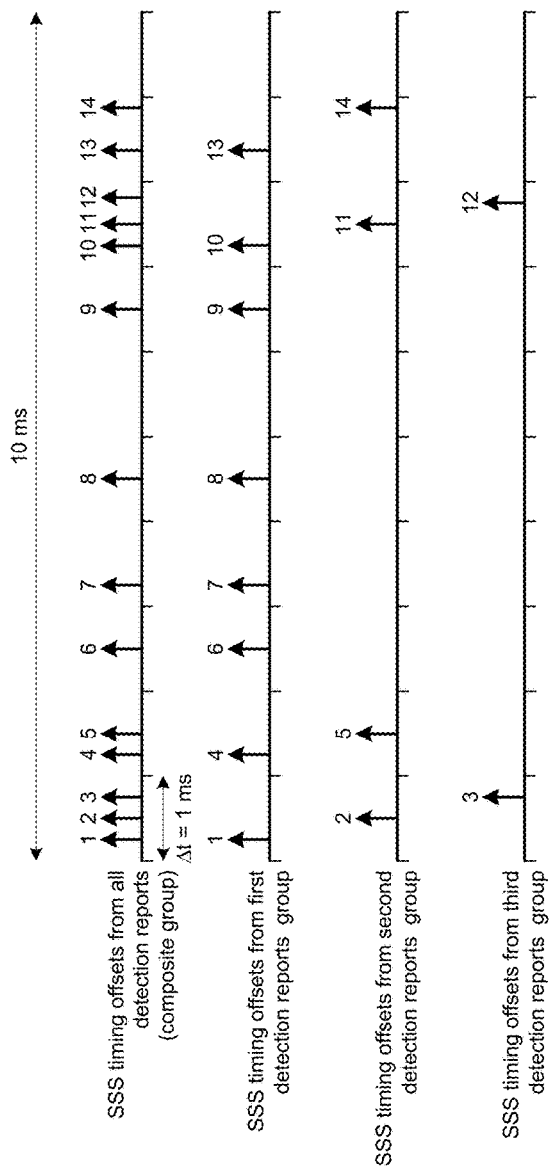
FIG. 6 illustrates exemplary sorting of the SSS detection reports into multiple groups according to aspects of the present invention.

In one aspect, the general process is continued until all the SSS detection reports are processed such that each SSS detection reports group contains detection reports whose timing difference between adjacent detection reports is greater than the configurable threshold of time $\Delta t$. FIG. 6 illustrates an example outcome of the multi-stage sorting and grouping procedure for $\Delta \tau = 1$ ms according to aspects of the present invention. In accordance with the above, in the example of FIG. 6 a first report (report 1) is kept in place in a first group but reports 2 and 3 cannot be placed in the first group as they are closer than $\Delta \tau = 1$ ms. At the same time, other reports separated by $\Delta \tau = 1$ ms or higher are placed in the first group. Report 2 will be placed in a second group when the process is repeated (see steps 1106 to 1110 in FIG. 11A). Report 3 will be placed in a third group when the process is repeated again.

According to another aspect of the present invention, the client terminal may schedule the PBCH decoding corresponding to all the SSS time offsets in the selected sorted SSS detection reports group. According to another aspect of the present invention, the initial SSS detection reports group to start with may include the SSS detection report with the strongest metric. According to an aspect of the present invention the metric used for the selection of the group may be the SINR from the SSS detection report.

Figure 7:
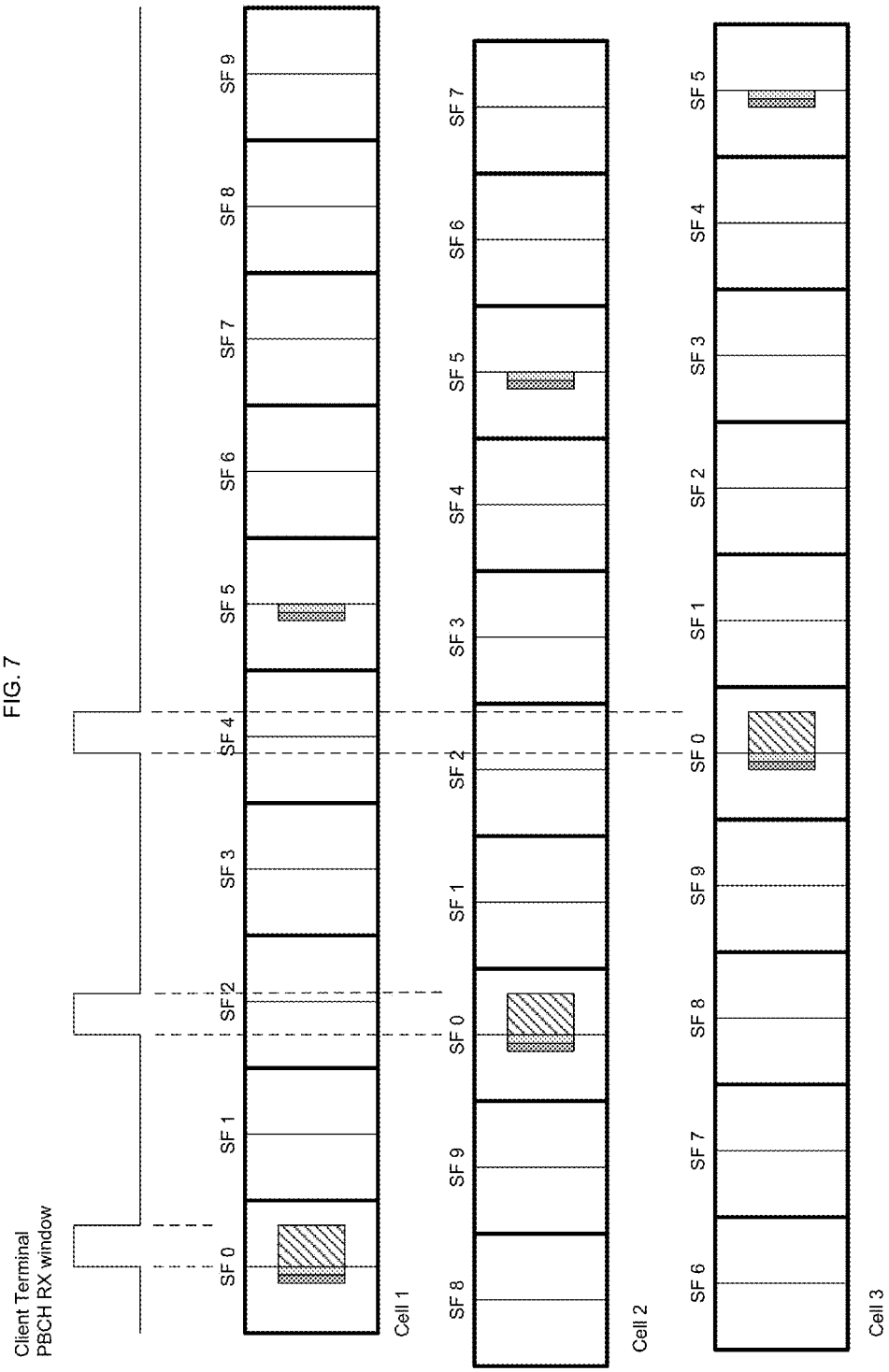
FIG. 7 illustrates exemplary scheduling of windows over one radio frame for combining and parallel hypotheses for multiple cells according to aspects of the present invention.
Figure 8:
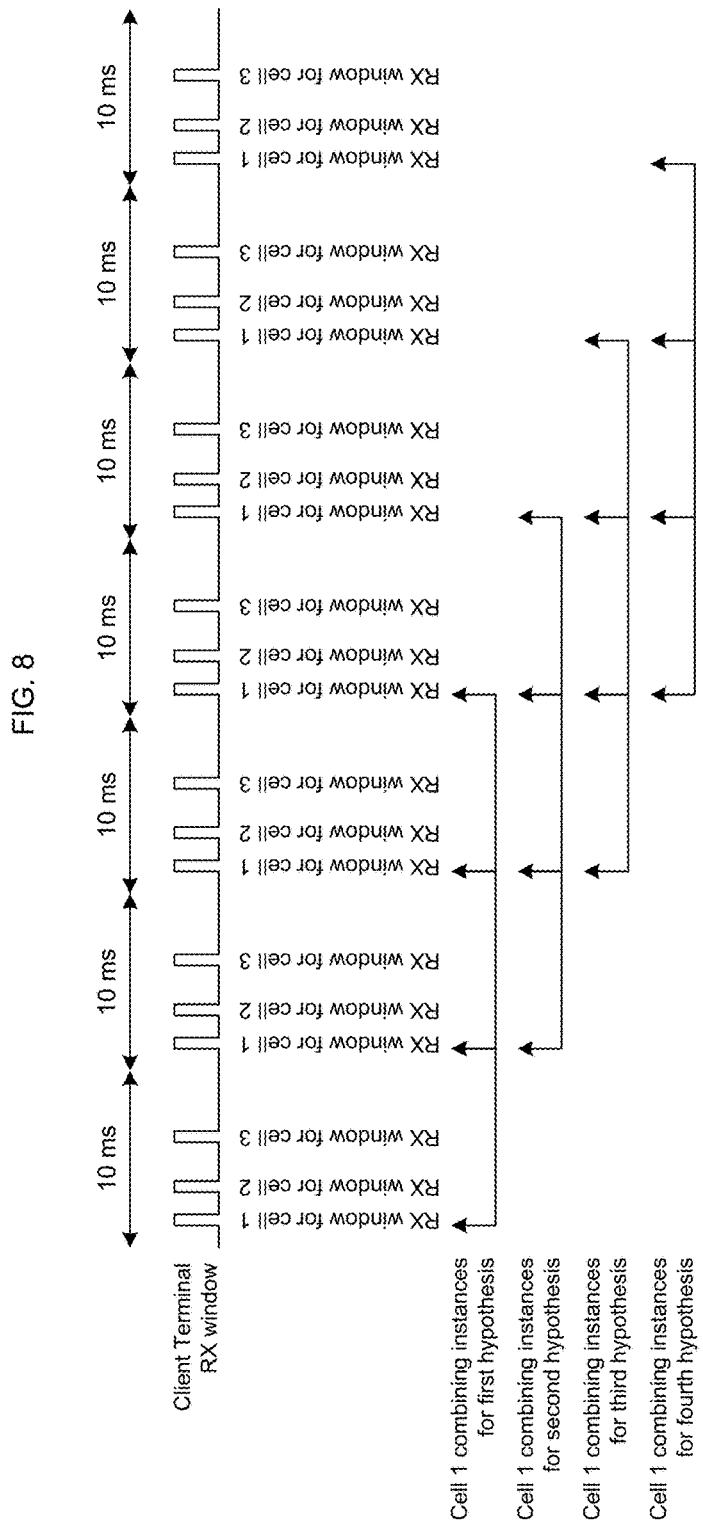
FIG. 8 illustrates exemplary scheduling of windows over seven radio frames for combining and parallel hypotheses for multiple cells according to aspects of the present invention.

According to another aspect of the present invention the client terminal opens and closes the receive window for respective SSS timing offsets to perform PBCH reception and decoding for each of the SSS timing offsets in the group in parallel as shown in FIG. 7. This shows an example case of three SSS detection reports in the first SSS detection reports group. According to another aspect of the present invention, the combining of the PBCH from one radio frame to another may be continued in parallel for all the PBCHs corresponding to each of the SSS timing offsets in the currently selected SSS detection reports group. According to another aspect of the present invention the log likelihood ratios (LLRs), also known as soft bits, for each of the channel bits may be saved in a separate buffer for the PBCH decode corresponding to each of the SSS time offsets in the selected SSS detection reports group. According to another aspect of the present invention, if the PBCH decoding for a cell fails in first attempt, during the subsequent receive window opening for each PBCH the soft bits from previous PBCH decoding attempts for the same SSS detection reports group may be combined as shown in FIG. 8. Note that for each of the three cells illustrated in FIG. 8, four parallel hypotheses are attempted. According to another aspect of the present invention, a successful PBCH decoding may occur for different SSS time offsets within the group at different number of combining attempts.

Figure 9:
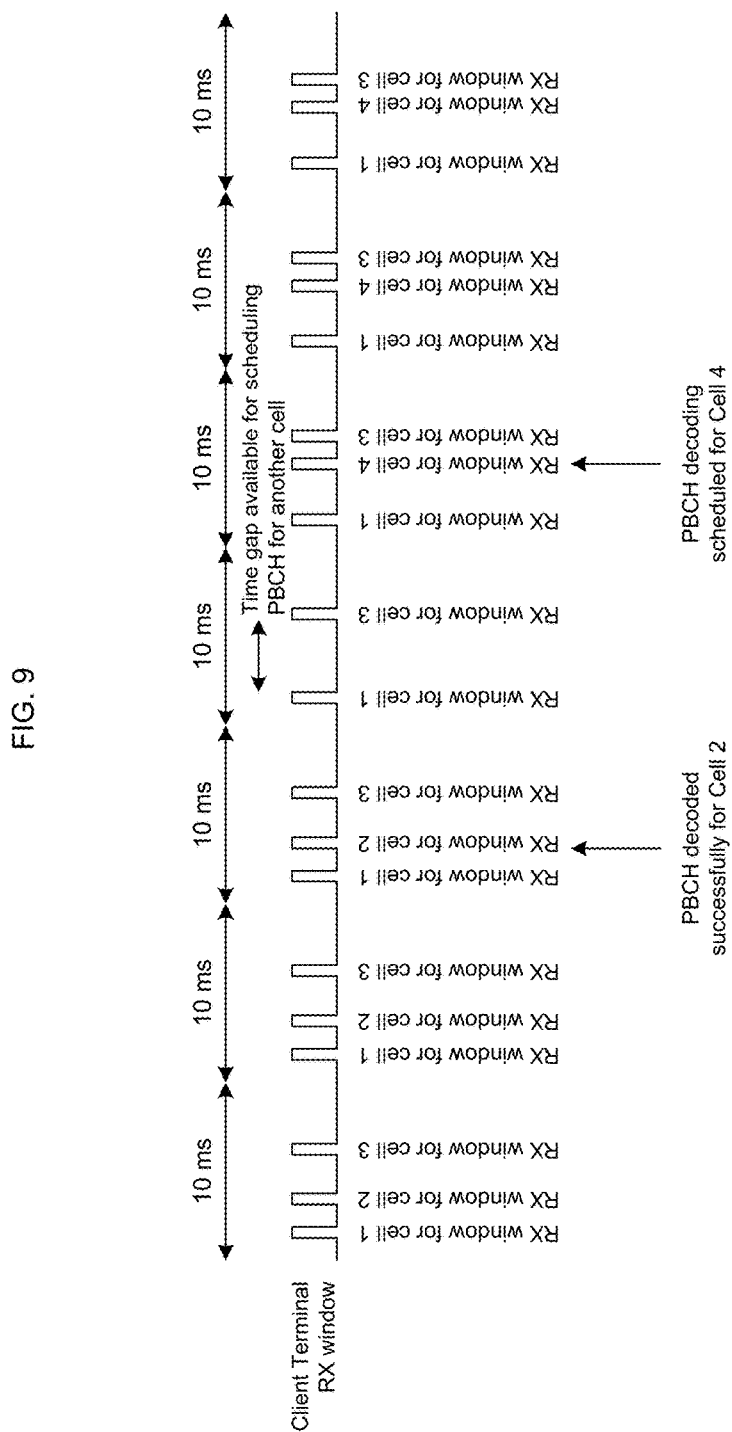
FIG. 9 illustrates exemplary scheduling of windows for combining parallel hypotheses for multiple cells and dynamically scheduling PBCH decoding for remaining cells when PBCH decoding for one cell is successful before the completion of seven frames duration according to aspects of the present invention.

According to another aspect of the present invention, whenever a PBCH decode for one SSS time offset completes, a new candidate from the second SSS detection reports group is searched to be inserted in the available time gap for decoding the PBCH as shown in FIG. 9. This process of selecting the next candidate for decoding and inserting in the currently ongoing parallel PBCH decoding with gaps for the candidates that are already decoded successfully preferably continues until the PBCH decoding for all of the SSS detection reports from all of the groups has been processed. According to aspects of the present invention, the client terminal may put the parallel PBCH decoding on hold if it detects one or more successful PBCH decodes. The client terminal may resume PBCH decoding with the remaining time offsets in the SSS detection report groups. The soft bits buffer may be cleared if the time gap between two PBCH decoding attempts is longer than four radio frames.

Figure 10:
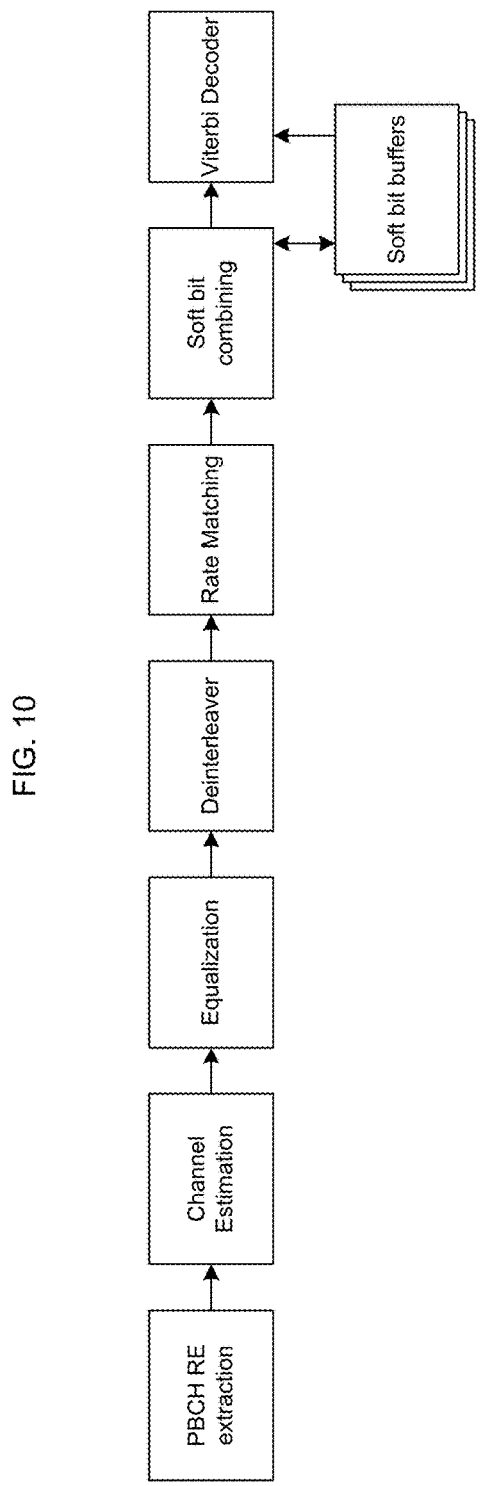
FIG. 10 illustrates a block diagram of a PBCH decoder according to aspects of the present invention.

FIG. 10 shows a PBCH decoder block diagram according to aspects of the present invention. Preferably, a single PBCH decoder is instantiated and it is associated with multiple soft-bit buffers corresponding to each cell and each hypothesis within a cell corresponding to the lower two bits of the frame number.

Figure 11A:
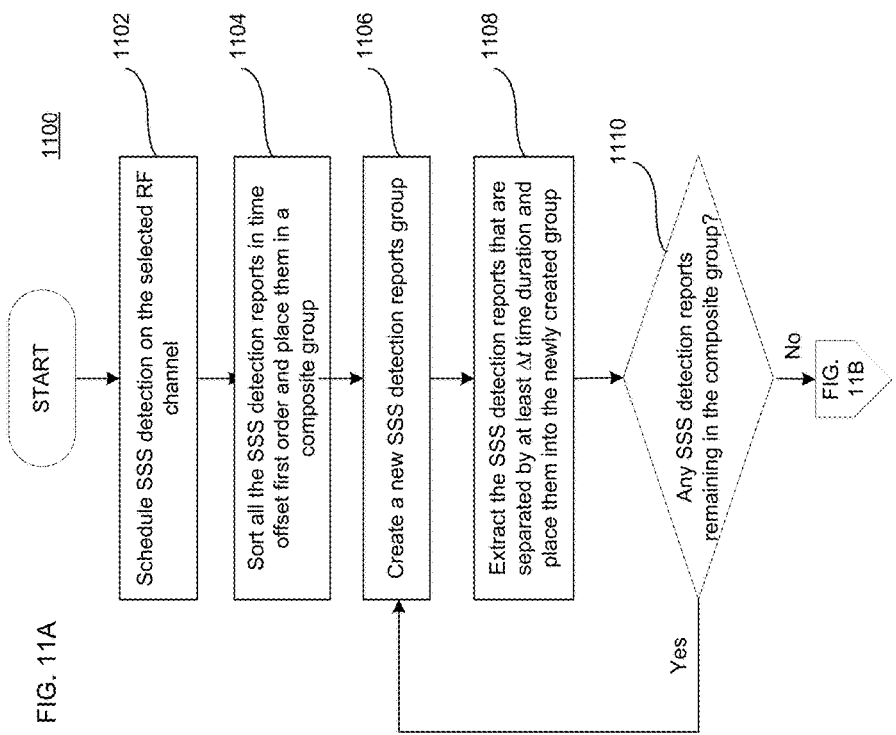
FIGS. 11A-B illustrate an example flow diagram for processing steps according to aspects of the present invention.
Figure 11B:
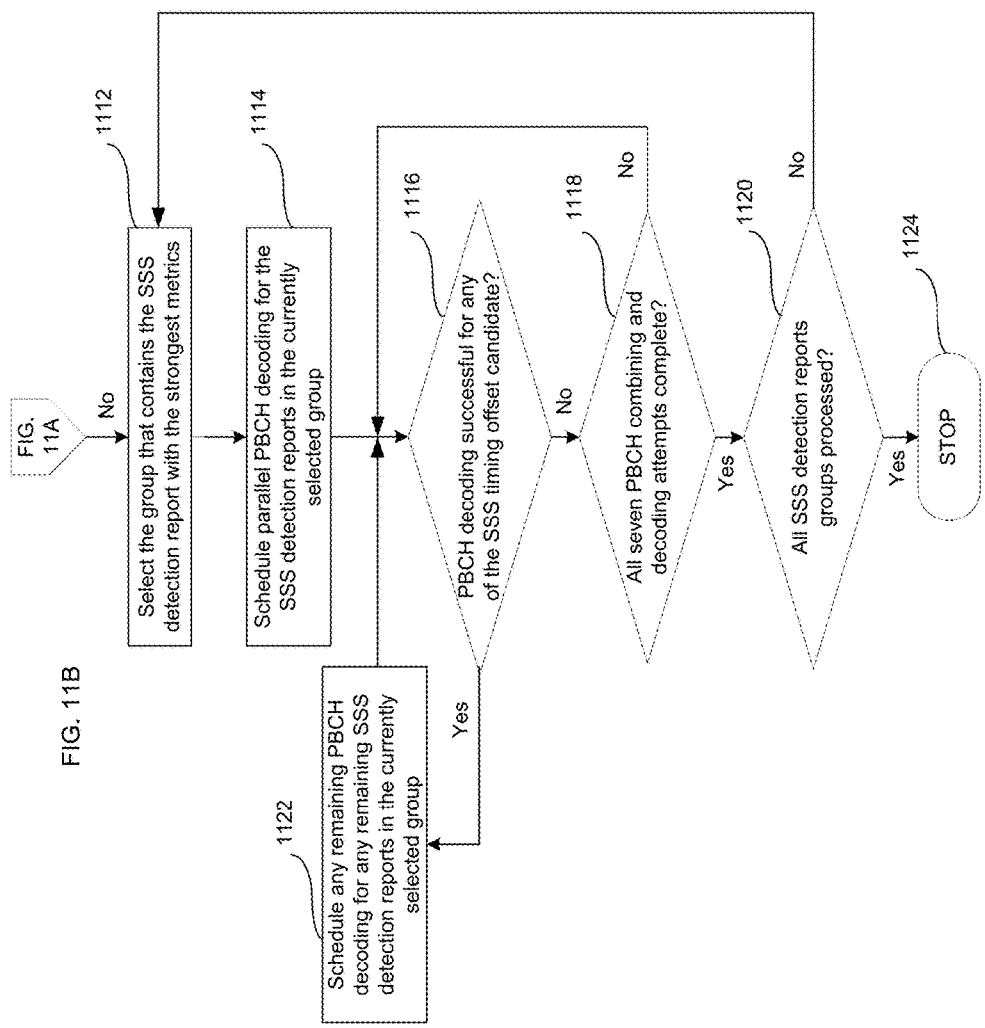

The flow diagram 1100 contained in FIGS. 11A-B illustrates an exemplary multiple parallel PBCH decoding method according to various aspects of the present invention. The processing begins in the processing stage 1102, where SSS detection is triggered for the selected RF channel. At processing stage 1104 the SSS detection reports are sorted in a time-first order from a lowest time offset to a highest time offset and placed in a composite group. At processing stage 1106 a new SSS detection reports group is created with no SSS detection reports in the group initially. At processing stage 1108, all the SSS detection reports in the composite group that are separated from each other by at least Δt time duration are removed and placed in the newly created SSS detection reports group. When the processing stage 1106 and 1108 are performed for the first time, the newly created group may be referred as the "first" SSS detection reports group. At processing stage 1110 the composite group is checked to see whether all of the SSS detection reports have been removed and placed into other SSS detection reports groups. If the composite group is not empty, the processing returns to the processing block 1106 where another new SSS detection reports group is created. This time the newly created group is referred as a "second" SSS detection reports group. The processing loop involving the blocks 1106, 1108, and 1110 continues until the composite group becomes empty. For each iteration through this loop, a new SSS detection reports group is created and referred as the "first" SSS detection reports group, "second" SSS detection reports group, "third" SSS detection reports group and so on.

When it is determined in block 1110 that the composite group has become empty, the processing moves to the processing block 1112 (FIG. 11B). Here, from the one or more newly created SSS detection reports groups the group containing the strongest SSS detection report is selected for further processing. At processing stage 1114, the SSS time offsets from the selected SSS detection reports group are used to schedule parallel PBCH decoding for multiple cells. At processing stage 1116, whenever a PBCH instance occurs for any of the cells, a decoding attempt is made. If the decoding is successful the processing moves to block 1122. If the decoding is not successful, the processing continues for other cells until the next instance of PBCH is received for other cells in the SSS detection reports group.

At processing block 1122, if there are any remaining SSS time offsets pending to be scheduled for PBCH decoding, they are scheduled for decoding in place of the decoding attempt terminated by the successful decoding of a previously scheduled PBCH decoding attempt. The processing then returns to the processing block 1116, where each new instance of PBCH is received and combined with previously received instances before the decoding attempt is made.

After each instance of decoding failure at the processing block 1116, the processing moves to the processing block 1118 to check whether the maximum seven combining attempts have been made for each SSS time offset. If not all seven combining attempts are made, the processing returns to the processing block 1116. If all seven decoding attempts for all the SSS time offsets are completed or the PBCH decoding has been successful, the processing moves to the processing block 1120. In the processing block 1120 it is checked whether all the SSS detection reports groups created at processing block 1106 have been processed. If there are any SSS detection reports groups remaining to be processed, the processing returns to the processing block 1112. If all the SSS detection reports groups are processed, the processing terminates at stage 1124.

By way of example only, the above-described method may be implemented in a receiver, e.g., a user device such as a wireless mobile station (MS) 12 as shown in FIG. 1.

As shown in FIG. 12, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 14:
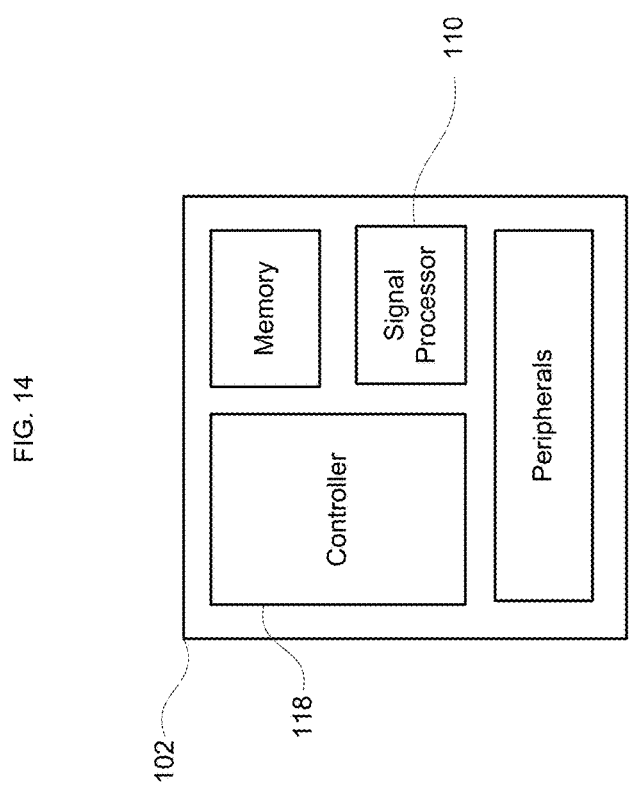
FIG. 14 illustrates a block diagram of a baseband subsystem for a wireless mobile station, which may be employed with aspects of the invention described herein.
Figure 15:
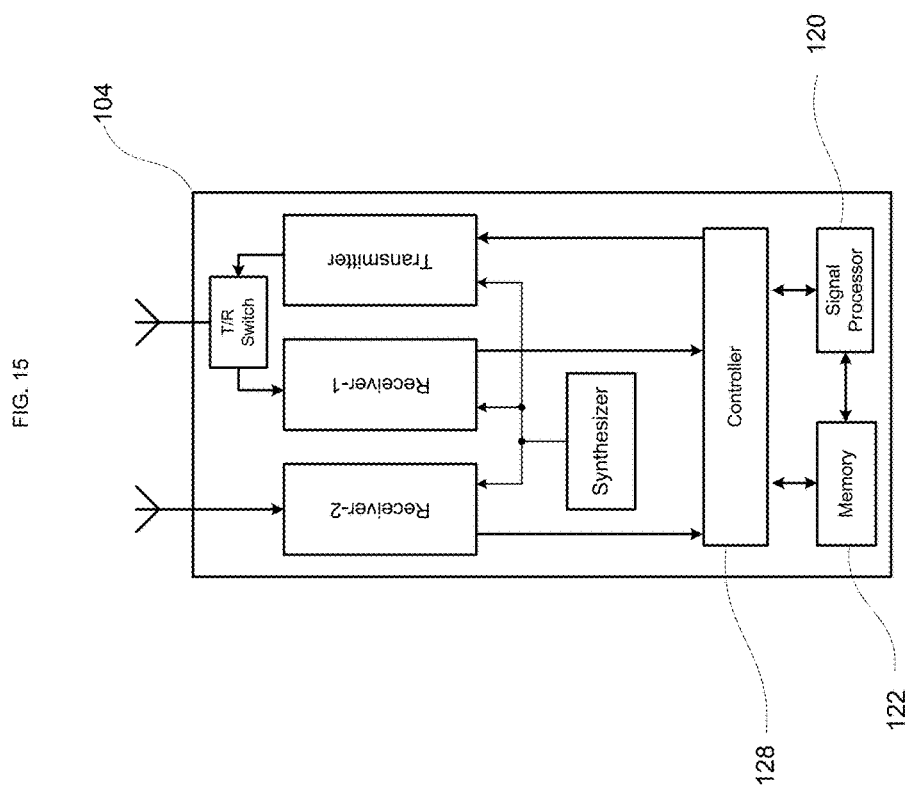
FIG. 15 illustrates a block diagram of an RF subsystem for a wireless mobile station, which may be employed with aspects of the invention described herein.

The application processor subsystem 101 as shown in FIG. 13 may include a controller 108 such as a microcontroller or other processor. The baseband subsystem 102 as shown in FIG. 14 may include a controller 118 such as a microcontroller or other processor. The RF subsystem 104 as shown in FIG. 15 may include a controller 128 such as a microcontroller or other processor. The controller 108 desirably handles overall operation of the MS 100. This may be done by software or firmware running on the controller 108. Such software/firmware may embody any methods in accordance with the aspects of the present invention.

In FIG. 14 the peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem as shown in FIG. 12. In another alternative, aspects of the present invention may also be implemented as a combination of firmware and hardware of the application processor subsystem 101 and/or the baseband subsystem 102. For instance, signal processing functionality of any or all of the FIG. 14 may be implemented in firmware and/or software, which is executed by the system hardware. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The various aspects of the invention described herein provide a new and more efficient method of processing for wireless client terminals. And this leads to improved performance of such portable communication devices in cellular communications systems.

The consumer electronics devices that may use this invention may include smartphones, tablets, laptops, gaming consoles, cameras, video camcorders, TV, car entertainment systems, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A method comprising:
obtaining, by a processor of a wireless communication device, a plurality of Secondary Synchronization Signal (SSS) detection reports, each SSS detection report including one or more SSS detection metrics therein, and each SSS detection report having a timing offset associated therewith relative to internal timing of the wireless communication device;
partitioning, by the processor, the SSS detection reports into separate groups in accordance with the timing offsets to enable Physical Broadcast Channel (PBCH) decoding for multiple cells in parallel;
scheduling, by the processor, the parallel PBCH decoding corresponding to all SSS timing offset candidates in a selected one of the partitioned groups;
determining, by the processor, whether the PBCH decoding was successful for any of the SSS timing offset candidates in the selected partitioned group; and
using the successful PBCH decoding for communication between the client device and a given one of the multiple cells.

2. The method of claim 1, wherein partitioning the SSS detection reports into separate groups includes determining whether time differences between certain ones of the SSS detection reports satisfies a configurable threshold $\Delta t$.

3. The method of 1, wherein the selected partitioned group includes the SSS detection report having a highest ranked detection metric.

4. The method of claim 3, wherein the detection metric is a Signal to Interference plus Noise Ratio (SINR) from the SSS detection reports.

5. The method of claim 1, further comprising opening and closing a receive window for respective SSS timing offsets to perform PBCH reception and decoding for each SSS timing offset in a given group in parallel.

6. The method of claim 1, further comprising combining the PBCHs among selected radio frames in parallel for all the PBCHs corresponding to each of the SSS timing offsets in a currently selected SSS detection reports group.

7. The method of claim 1, further comprising saving soft bits for each channel bit in one or more separate buffers for the PBCH decoding corresponding to each of the SSS timing offset candidates in the selected partitioned groups.

8. The method of claim 7, wherein when the PBCH decoding for a cell fails in a first attempt, during a subsequent receive window opening for each PBCH the soft bits from a previous PBCH decoding attempt for corresponding ones of the SSS detection reports group are combined.

9. The method of claim 1, wherein whenever the PBCH decoding for one SSS timing offset completes, a new candidate from a second SSS detection reports group is searched for insertion into an available time gap for decoding the PBCH.

10. The method of claim 1, further comprising placing the parallel PBCH decoding on hold upon detection of one or more successful PBCH decoding operations.

11. The method of claim 1, further comprising:
instantiating a single PBCH decoder to perform the parallel PBCH decoding; and
associating the single PBCH decoder with multiple soft-bit buffers corresponding to each cell and each hypothesis within a cell corresponding to two lowest bits of a frame number.

12. A wireless communication apparatus comprising:
means for receiving signals from one or more cells in a wireless communication system; and
one or more processing devices operatively coupled to the receiving means, the one or more processing devices being configured to:
obtain a plurality of Secondary Synchronization Signal (SSS) detection reports, each SSS detection report including one or more SSS detection metrics therein, and each SSS detection report having a timing offset associated therewith relative to internal timing of the wireless communication apparatus;
partition the SSS detection reports into separate groups in accordance with the timing offsets to enable Physical Broadcast Channel (PBCH) decoding for multiple cells in parallel;
schedule the parallel PBCH decoding corresponding to all SSS timing offset candidates in a selected one of the partitioned groups;
determine whether the PBCH decoding was successful for any of the SSS timing offset candidates in the selected partitioned group; and
use the successful PBCH decoding for communication between the wireless communication apparatus and a given one of the cells.

13. The wireless communication apparatus of claim 12, wherein the one or more processing devices are further configured to open and close a receive window for respective SSS timing offsets to perform PBCH reception and decoding for each SSS timing offset in a given group in parallel.

14. The wireless communication apparatus of claim 12, wherein the one or more processing devices are further configured to combine the PBCHs among selected radio frames in parallel for all the PBCHs corresponding to each of the SSS timing offsets in a currently selected SSS detection reports group.

15. The wireless communication apparatus of claim 12, wherein the one or more processing devices are further configured to save soft bits for each channel bit in one or more separate buffers for the PBCH decoding corresponding to each of the SSS timing offset candidates in the selected partitioned groups.

16. The wireless communication apparatus of claim 12, wherein the one or more processing devices are further configured to:

instantiate a single PBCH decoder to perform the parallel PBCH decoding; and associate the single PBCH decoder with multiple soft-bit buffers corresponding to each cell and each hypothesis within a cell corresponding to two lowest bits of a frame number.

\* \* \* \* \*